United States Patent Office 2,756,125
Patented July 24, 1956

2,756,125

PRODUCTION OF URANIUM HEXAFLUORIDE

Philip H. Abelson, Washington, D. C.

No Drawing. Application August 21, 1942,
Serial No. 455,581

15 Claims. (Cl. 23—14.5)

(Granted under Title 35, U. S. Code (1952), sec. 266)

This invention relates to the production of uranium hexafluoride, and it is an improvement over the method disclosed in my copending application, Serial No. 397,140, filed June 7, 1941, now abandoned.

In my copending application I have disclosed a method of making $UF_6$ from $UF_4$ by exposure of the latter to gaseous fluorine, preferably at elevated temperature and in the presence of a catalyst, the method there disclosed being an improvement over the prior known process of treating uranium metal with fluorine or replacing the chlorine in $UCl_5$ to produce a mixture of $UF_4$ and $UF_6$.

I have now found a simpler, more economical and safer method of making $UF_6$. In my new process, the $UF_6$ is obtained from cheaper and more easily obtainable uranium compounds and a catalyst is not required to obtain reasonably fast reaction rates at temperatures below 400° C. The $UF_6$ may be obtained in a single operation or the process may be conducted stepwise, with the separate treatment of intermediate compounds to produce the $UF_6$.

My new process comprises treating a salt or compound of uranium which may be designated as a "metal fluouranite" with fluorine gas. For high reaction rates it is necessary to conduct the reaction at elevated temperatures, for example, in excess of about 200° C., and the preferred temperature range is from about 300° to about 400° C. Contrary to previous belief the $UF_6$ distills (or sublimes) from the metal fluouranite in pure form and in quantitative yields, and it is easily collected by cooling the exit gases from the reaction zone. A catalyst, such as a halogen or halogen compound, may be used to lower the reaction temperature, but the slight benefits of the catalyst are to a large extent offset by the nuisance of introducing a foreign, or unwanted, substance into the reaction zone, and accordingly its use is not recommended for optimum conditions of operation.

By the term "metal fluouranite" I refer to those compounds wherein the uranium is in the quadrivalent state, the formula for which may be written in the form of a double salt although the precise structure is not known. As a double salt the formula is $$R_xF_y(UF_4)_z$$

where R is a metal and $x$, $y$ and $z$ are small whole numbers. The values of $x$, $y$ and $z$ will depend on the valence of R and the complexity of the double salt, because there is reason to believe that in many cases the uranium tetrafluoride and metal fluoride are not in equimolecular proportions. The preferred compounds, and most easily obtainable, are the alkali metal and alkaline earth metal fluouranites, such as $KUF_5$, $NaUF_5$, $CaUF_6$ and the like. These salts may be written according to the formula as $KF(UF_4)$, $NaF(UF_4)$ and $CaF(UF_4)$ in their simplest form. However the metal fluouranites are equally suitable for use in this invention regardless of their complexity.

The process is best carried out by placing the metal fluouranite in a nickel chamber, heating to a temperature between 300° and 400° C. (preferably about 350° C.) and passing dry fluorine gas into the reaction chamber. The exit gases are cooled in conventional manner, whereupon the $UF_6$ solidifies and excess fluorine is returned for use. There is reason to believe that the fluorination takes place stepwise, first forming an intermediate substance wherein the uranium appears to have a valence of five. This intermediate is either $UF_5$ or a complex salt of $UF_5$ corresponding to the fluouranite. The corresponding formula for this compound would be $$R_xF_y(UF_5)_z$$

The reason for believing in the stepwise reaction is that the fluorine is absorbed or combined with the metal fluouranite almost quantitatively until an amount has been consumed which is equivalent to the formation of the intermediate having a uranium valence of five, whereupon further treatment with fluorine requires an excess of the latter to produce the $UF_6$. Therefore it is more economical to conduct the reaction in two separate chambers. In the first chamber is placed the already partially treated compound, or intermediate, and in the second chamber is placed the fresh metal fluouranite. The fluorine is passed first in contact with the intermediate, in excess, the exit gases cooled to remove $UF_6$ and then passed into the second chamber where substantially all fluorine is absorbed. In order to facilitate control, provision is made for cooling the small amount of exit gases from the second chamber to remove contained $UF_6$ and to return uncombined fluorine to the first reaction chamber. When the amount of fluorine leaving the second chamber begins to rise, the formation of the intermediate is complete, whereupon it is transferred to the first chamber and fresh fluouranite is placed in the second chamber. However, the most economical point in the reaction at which the materials are transferred depends on a number of well understood engineering factors, which are easily evaluated by those skilled in the art.

The metal fluouranites, particularly the alkali metal salts, are all easily prepared according to standard practice from sodium uranate, $Na_2UO_4$, which is the cheapest uranium salt available. One method involves treating the sodium uranate with aqueous hydrofluoric acid to produce uranyl fluoride, $UO_2F_2$, and reducing the latter, while it is still in solution from the previous reaction, with additional hydrofluoric acid and metallic tin to obtain $NaF(UF_4)$. However, other methods may be used to prepare the metal fluouranite, and the method by which it originates forms no part of this invention.

The fluorination reaction whereby the $UF_6$ is produced proceeds smoothly with no danger of explosion when carried out as disclosed. Yields as high as 100% have been consistently obtained.

Other metals and materials besides nickel may be used for the reaction chamber, such as aluminum, but due to the corrosive properties of fluorine nickel has proven to be particularly desirable.

Many variations will be apparent to those skilled in the art and the invention should not be limited other than as defined in the appended claims.

The invention described herein may be manufactured and used by or for the Government of the United States of America for governmental purposes without the payment of any royalties thereon or therefor.

I claim:

1. Process for preparing $UF_6$ which comprises reacting an alkali metal fluouranite with fluorine at a temperature of at least about 200° C. to produce a quinquevalent uranium compound and then treating said quinquevalent uranium compound with additional fluorine at a temperature of at least about 200° C. to produce $UF_6$.

2. Process for preparing $UF_6$ which comprises reacting an alkali metal fluouranite with fluorine at a temperature within the range of about 300° to about 400° C. to produce a quinquevalent uranium compound and then treating said quinquevalent uranium compound with additional fluorine at a temperature within said range to produce $UF_6$.

3. Process for preparing $UF_6$ which comprises reacting sodium fluouranite with fluorine at a temperature within the range of about 300° to about 400° C. to produce a quinquevalent uranium compound and then treating said quinquevalent uranium compound with additional fluorine at a temperature within said range to produce $UF_6$.

4. Process for preparing $UF_6$ which comprises reacting potassium fluouranite with fluorine at a temperature within the range of about 300° to about 400° C. to produce a quinquevalent uranium compound and then treating said quinquevalent uranium compound with additional fluorine at a temperature within said range to produce $UF_6$.

5. Process for preparing $UF_6$ which comprises reacting a compound selected from the group consisting of alkali metal and alkaline earth metal fluouranites with fluorine at a temperature of at least about 200° C.

6. The process of claim 5 wherein the compound is calcium fluouranite.

7. The process for preparing $UF_6$ which comprises reacting alkali metal fluouranite with fluorine at a temperature of at least about 200° C.

8. Process for preparing $UF_6$ which comprises reacting sodium fluouranite with fluorine at a temperature of at least 200° C.

9. Process for preparing $UF_6$ which comprises reacting potassium fluouranite with fluorine at a temperature of at least 200° C.

10. Process for preparing $UF_6$ which comprises reacting a compound selected from the group consisting of alkali metal and alkaline earth metal fluouranites with fluorine at a temperature within the range of about 300° C. to about 400° C.

11. The process of claim 10 wherein the compound is calcium fluouranite.

12. Process for preparing $UF_6$ which comprises reacting an alkali metal fluouranite with fluorine at a temperature within the range of about 300° C. to about 400° C.

13. Process for preparing $UF_6$ which comprises reacting sodium fluouranite with fluorine at a temperature within the range of about 300° C. to about 400° C.

14. Process for preparing $UF_6$ which comprises reacting potassium fluouranite with fluorine at a temperature within the range of about 300° C. to about 400° C.

15. The process of preparing $UF_6$ from a compound selected from the group consisting of alkali metal and alkaline earth metal fluouranites comprising reacting a mass of such compound with fluorine to form a quinquevalent uranium salt, thereafter reacting the quinquevalent uranium salt with fluorine in excess to form $UF_6$, condensing $UF_6$ from the excess fluorine and reacting the excess fluorine with another mass of such compound to form a quinquevalent uranium salt.

References Cited in the file of this patent

UNITED STATES PATENTS 1,826,806    Marden _____ Oct. 13, 1931

OTHER REFERENCES

Chem. Abs. 4, 1949.    (Copy in Div. 6.)
Chem. Abs. 5, 3772.    (Copy in Div. 6.)